May 12, 1970    F. VENUS, JR    3,511,418
VARIABLE CAPACITY AEROSOL METERING VALVE
Filed July 29, 1968    3 Sheets-Sheet 1
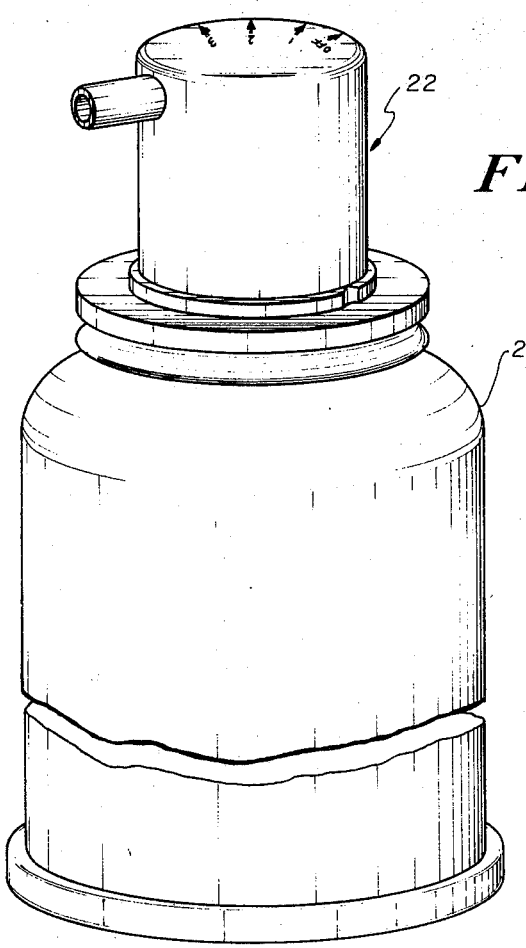
FIG.1
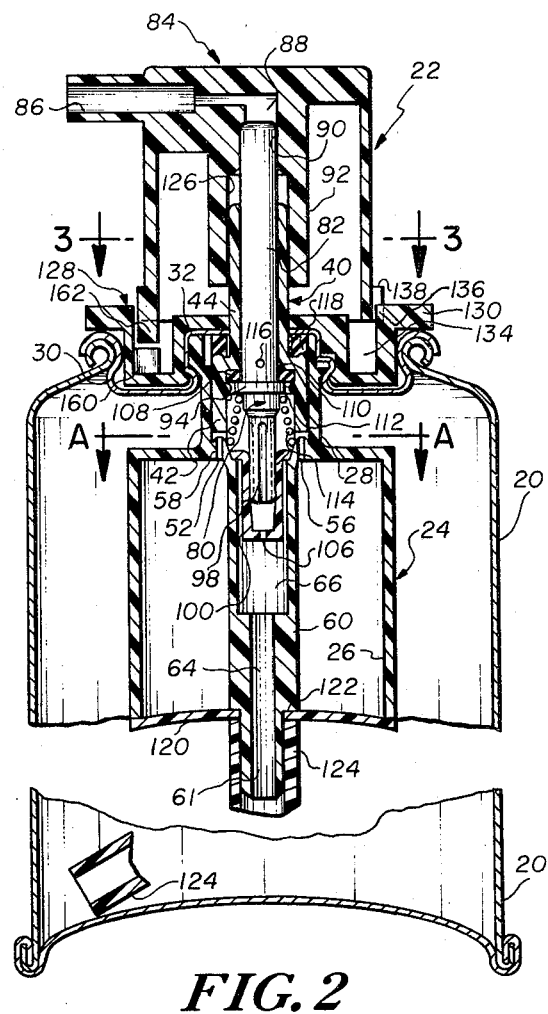
FIG.2
FIG.3
INVENTOR.
FRANK VENUS, JR.
BY Steward + Steward
HIS ATTORNEYS May 12, 1970   F. VENUS, JR   3,511,418
VARIABLE CAPACITY AEROSOL METERING VALVE
Filed July 29, 1968   3 Sheets-Sheet 2

INVENTOR.
FRANK VENUS, JR.
BY Steward + Steward
HIS ATTORNEYS

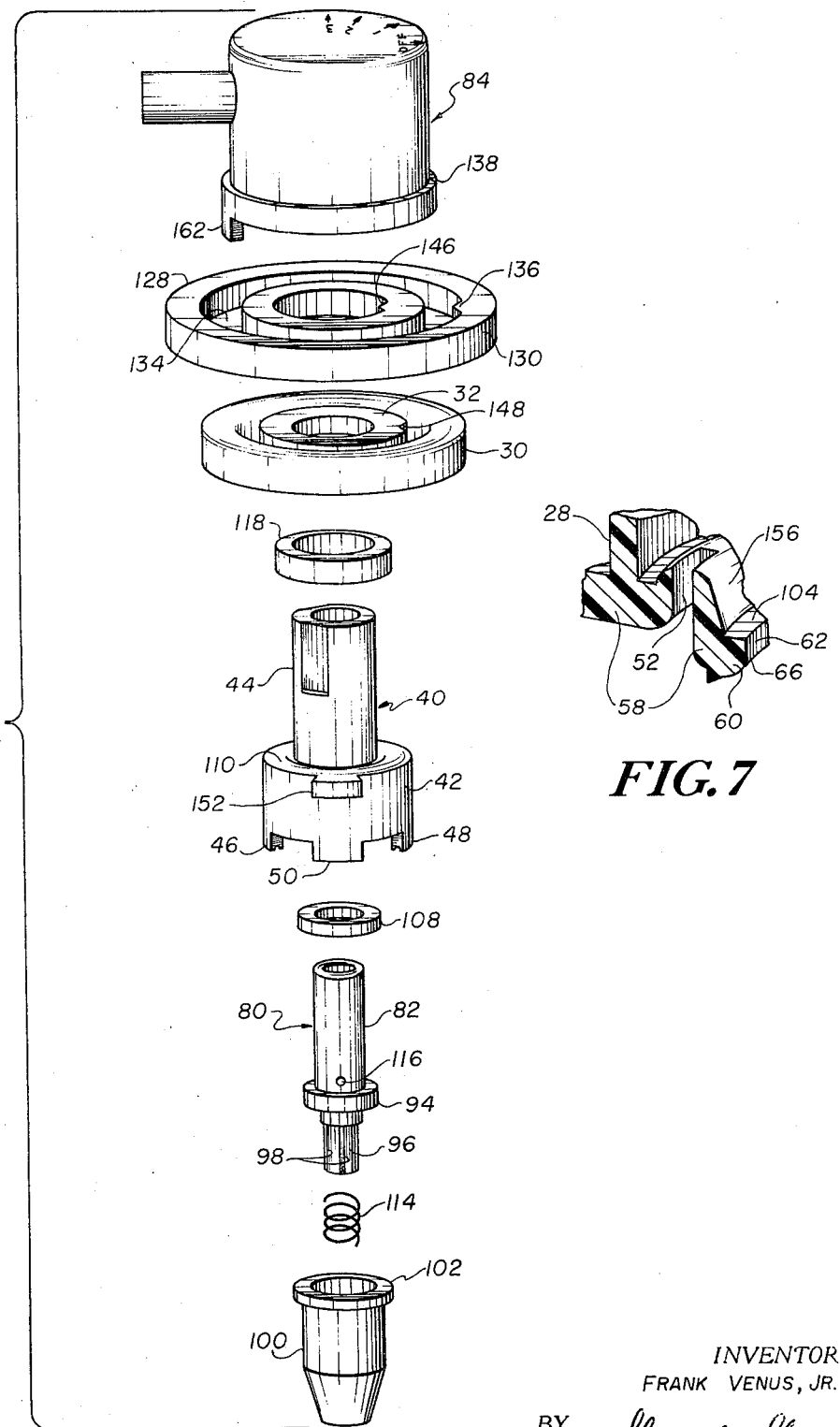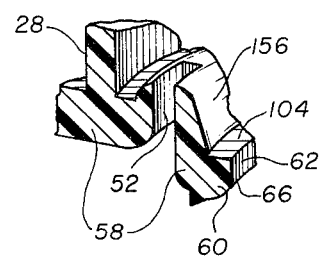

3,511,418
VARIABLE CAPACITY AEROSOL METERING VALVE

Frank Venus, Jr., Watertown, Conn., assignor to The Risdon Manufacturing Company, Naugatuck, Conn., a corporation of Connecticut
Filed July 29, 1968, Ser. No. 748,269
Int. Cl. B65d 83/00
U.S. Cl. 222—402.20                10 Claims

ABSTRACT OF THE DISCLOSURE

An aerosol valve of the metering type having selectively positionable means to effect dispensing of any one of several different predetermined measured volumes of fluid upon each operation of the valve.

---

This invention relates to aerosol valves of the metering type, and more particularly to means selectively positionably by the user to permit him to dispense, during a cycle of valve operation, any one of several different predetermined measured volumes of fluid from a pressurized container to which the valve is attached.

Metering valves for dispensing a single predetermined volume of fluid from a pressurized package are of course well known. U.S. Pat. Nos. 3,185,356, 2,932,432 and 3,104,785 illustrate three different designs typical of such valves. In each case, however, the amount of product discharged by such valves upon actuation is completely predetermined during manufacture, and the customer or user has no way of varying the volume of discharge between one cycle of valve operation and the next. It is accordingly necessary, where a customer wants to dispense more product than a single predetermined measured volume, to actuate the valve through a second, third, etc., cycle of operation.

It is accordingly a principal purpose of the present invention to provide metering valve designs which, while capable of dispensing a predetermined measured volume of fluid from a self-pressurized package, may be selectively conditioned or positioned by the customer to change the amount of product dispensed in any given cycle of valve operation. To this end, there is disclosed herein a metering valve which incorporates a plurality of metering or measuring chambers, and porting means selectively positionable by the user to bring any one or more of such metering chambers into operation, so that fluid product contained in one or more of such chambers will be discharged during one cycle of valve operation.

The invention is illustrated by the valve design shown in the accompanying drawings and described more fully hereinafter.

In the drawings,

FIG. 1 is a fragmentary perspective view in side elevation showing a valve of the invention mounted on an aerosol container;

FIG. 2 is a vertical section through the container and valve assembly of FIG. 1;

FIG. 3 is a cross-sectional view taken on line 3—3 of FIG. 2;

FIG. 6 is an exploded view of the valve core components, mounting ferrule and position indicator ring associated with the valve body;

FIG. 7 is a fragmentary view on an enlarged scale of a porting arrangement in the valve housing.

Figure 4:
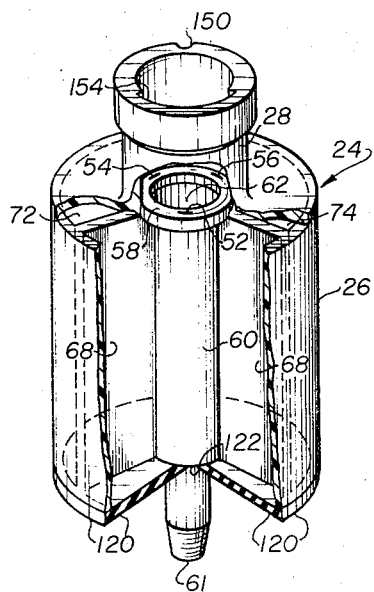
FIG. 4 is a perspective view in side elevation, parts being broken away, of the body of the valve.

A typical aerosol or self-pressurized package is illustrated in FIGS. 1 and 2 in which a container 20 has a conventional mouth or opening at one end within which the valve assembly 22 is mounted by a ferrule 30 to support the assembly and close off the mouth of the container. The valve assembly comprises a cylinder valve body 24 consisting of a multi-compartmented reservoir portion 26 and a neck portion 28 joined thereto each portion being open at its respective free end. Valve body 24 and the remaining components of the complete valve assembly 22 which will be described more fully presently are supported by mounting ferrule 30 in container 20 by crimping the periphery of the ferrule to the lip surrounding the mouth of the container in conventional manner. Ferrule 30 has a central upstanding boss 32 within which the upper rim of neck 28 is received and gripped. Boss 32 is centrally apertured to permit passage therethrough of the valve core members which will now be described.

A first tubular valve core 40 is telescopically received in the neck 28 of the valve housing. As will appear hereinafter, core 40 is fixed axially of the assembly but is rotatable therein. Valve core 40 has an inner enlarged inverted cup portion 42 and an integrally connected axially projecting stem 44 of reduced diameter. The lower rim of cup 42 is castellated to provide a plurality (in this instance 3) of circumferentially spaced arcuate lands 46, 48, 50 of unequal extent. These lands are seen best in FIGS. 6 and 8–11. These lands cooperate with a corresponding plurality of ports 52, 54, 56, passing through a transverse wall 58 at the junction of the neck 28 and reservoir 26 members of the valve housing. Each of these ports respectively communicates the interior of valve housing neck 28 with one axial chamber into which the interior of the reservoir portion 28 of the valve body is divided.

Figure 5:
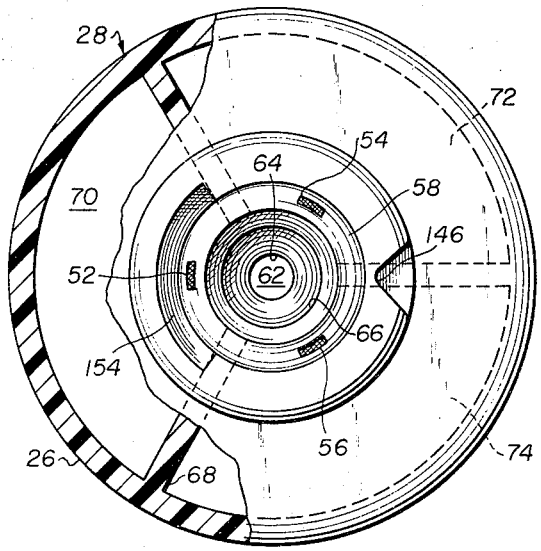
FIG. 5 is a top plan view of the valve body as seen in FIG. 4, partly broken away to show the interior construction.

As seen best in FIGS. 2, 4 and 5, valve body 24 is formed with a central hollow post 60 depending integrally from transverse wall 58 (see FIG. 7) and extending inwardly to an inlet 61 disposed below the lower edge of the side wall of reservoir 26. Post 60 is formed interiorly with longitudinal feed passage 64 and a communicating well 66 which forms an axial continuation of inlet 61. Reservoir portion 26 is likewise formed with a plurality of radially disposed partitions 68 intersecting the transverse wall 58 and dividing the reservoir interiorly into a plurality of axial chambers 70, 72, 74 of generally sectorial shape to which the ports 52, 54, 56, respectively communicate and which surround post 60. Post 60 and neck portion 28 of the valve body together constitute a fluid duct for the passage of fluid product from the interior of the container to the point of discharge.

The valve assembly 22 includes a second tubular valve core 80 which is telescopically received within the first core 40. Core 80 has an upstanding hollow stem portion 82 making a close sliding fit within the stem 44 of outer core 40. The hollow stem 82 projects axially outwardly of the end of stem 44 and is open at its outer end. An actuator button 84 is attached to the projecting end of inner stem 82. Button 84 is provided with a product discharge nozzle 86 connected interiorly by a passage 88 to a stem-receiving socket 90 formed into the hub 92 of the button.

Inner core 80 is closed at its inner end and is formed intermediate its length with an annular enlargement 94 constituting a valve head. Core 80 extends axially inward of enlargement 94 to provide a plunger portion 96 projecting into aperture 62 and well 66 of post 60 in valve body 24. Plunger 96 is formed with a plurality of circumferentially spaced longitudinal grooves 98 which run from the inner tip of the plunger and terminate just short of the annular enlargement 94. Plunger 96 received in a resilient boot 100 which, in turn, is received in well 66 of post 60. Boot 100 has an external peripheral flange 102 at its outer end which rests upon shoulder 104 (FIGS. 2, 7) surrounding aperture 62 to support the boot in well 66. Boot 100 is formed with an inlet aperture 106 at its bottom. The axial lengths of boot 100 and plunger 96 respectively are coordinated to provide endwise spaced relation of the plunger tip and bottom of the boot in the normal, non-depressed position of inner core 82, while effecting endwise abutment of these members in the depressed position of the core. In this latter position the inlet aperture 106 is closed by the plunger.

An annular sealing grommet 108 (FIGS. 2, 6) is held in position against the inner face of shoulder 110 of outer core 40 by an internal peripheral rib 112 in the bottom of inverted cup portion 42. Grommet 108 closely encircles stem 82 of inner core 80, and the annular shoulder or enlargement 94 of core 80 is normally urged against the grommet by a helical compression spring 114. This spring is confined between the shoulder 94 and flange 102 of boot 100. The spring thus also acts to hold boot 100 in place in well 66. A discharge orifice 116 in core 80 passes radially through the tubular stem portion 82 at a location spaced axially outwardly of shoulder 94 approximately equal to the thickness of the gasket 108. Discharge port 116 is thus normally disposed above gasket 108 in the nondispensing (non-depressed) position of valve core 80, as seen in FIG. 2.

Return spring 114 also acts through inner core 80 and gasket 108 to urge outer core 40 in axially outward direction relative to the valve body. A second annular gasket 118 encircles the stem portion 82 of core 40 and is normally confined between shoulder 110 of the core and the undersurface of the boss 32 of the mounting ferrule 30. Gasket 118 makes a sliding seal with stem 44.

The inner end of reservoir 26 of valve body 24 is covered by an annular disc or plate 120. The inner end of post 60 is reduced externally in diameter to provide a shoulder 122 at about the same axial location or slightly outwardly thereof as the termination of the side walls of the valve body. Disc 120 is fitted over the reduced stem portion so as to abut shoulder 122, thereby overlapping its periphery on the side wall of reservoir portion 26, closing off that end of the reservoir. There is also provided the usual dip tube 124 which fits over the reduced inner end of post 60 and extends downwardly to the bottom of container 20.

In order to provide means for rotating outer core 40 to obtain different porting arrangements relative to reservoir chambers 70, 72, 74, the outer end of stem 44 of the rotatable core is of non-circular cross section, and the core-receiving socket 126 of hub 92 in actuator button 84 is formed in corresponding manner to lock or key the actuator and core against relative rotation. Also, to give external indication of the selected rotated position of core 40, an annular indicator ring 128 is mounted over boss 32 of the mounting ferrule 30 and has a peripheral flange 130 which overlies the chime of container 20. Ring 128 is formed with an annular well 134 adapted to allow for telescoping of the skirt portion of actuator 84 axially of the valve assembly to permit depressing inner core 80 during actuation of the valve (FIG. 3). A reference boss 136 is formed in the periphery of well 134, and cooperates with detent notches 138, 140, 142, 144 formed in the adjacent periphery of the actuator button skirt to provide indicia means as to the valve setting.

The valve assembly operates in the following manner. A fluid product stored in container 20 under pressure of a liquifiable propellant gas is caused by such pressure to pass inwardly through dip tube 124 to well 66 of post 60. In the normal non-dispensing position of the valve assembly as seen in FIG. 2, fluid passes from well 66 upwardly through aperture 106 in boot 100 and axially along plunger 96 through grooves 98 into the interior of inverted cup portion 42 of core 40. Depending upon the rotated position of core 40 and the port or ports 52, 54, 56, opened thereby, fluid passes into the respective reservoirs 70, 72, 74. With inner core 80 in the non-dispensing position as shown in FIG. 2, gaskets 108 and 118 block any release of fluid product. Upon axially depressing actuator button 84, however, discharge port 116 is moved below gasket 108 into communication with the interior of the inverted cup portion 42 of the outer core, so that fluid may then enter port 116, pass upwardly through stem 82 and be discharged at discharge outlet 86 of the actuator. Concurrently with opening of port 116, aperture 106 is closed by endwise abutment of the plunger 96 with the button of boot 100. Preferably boot 100 is made of elastomeric material so that such endwise abutment occurs slightly in advance of port 116 passing below gasket 108, with further inward movement of core 80 being permitted by elastic extension of boot 100. With core 82 thus depressed, fluid contained in one or more of reservoir 70, 72, 74, depending upon the selected rotated position of button 84, will then be discharged through the respective ports 52, 54, 56, as previously described. Upon release of actuator button 84, the parts are returned by spring 114 to the starting position, thus completing a cycle of valve operation. The volume of product dispensed during the cycle depends on the indexed position of core 80 and button 84 relative to valve body 26. In order to provide correlation between the indexing positions of the detent arrangement in ring 128 and button 84 during assembly of the valve components in the manufacture of the valve, the ring is formed with a piloting boss 146, and a cooperating detent notch 148 is formed in ferrule 30, as well as a similar detent 150 in the lip of neck 28 of valve body 24 to assure proper registration reference. In addition, outer core 40 is also provided with a radially projecting arm 152 and the neck 28 of the valve body is correspondingly channeled at 154 to receive the arm and allow rotational movement of actuator button 84 and core 40 through an arc defined by the limits of channel 154.

Figure 8:
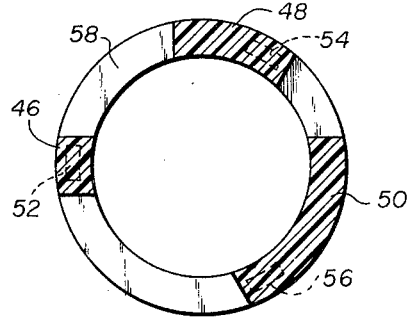
FIGS. 8–11 are semi-schematic views in cross-section on line A—A of FIG. 2 illustrating selectively different porting positions for effecting the dispensing of different volumes of fluid product by the valve assembly.
Figure 9:
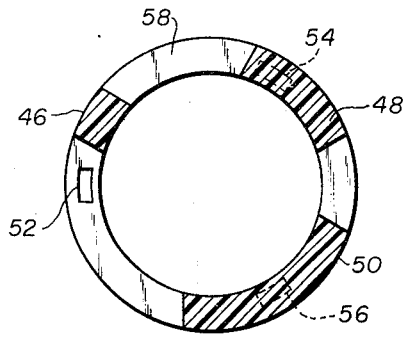
Figure 10:
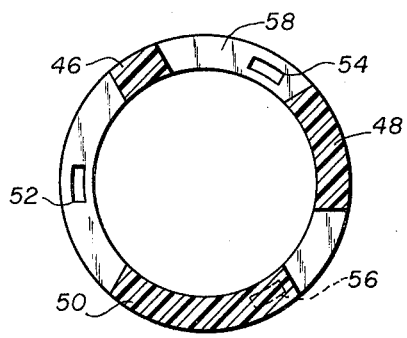

The various porting positions possible for the actuator button and rotatable core assembly specifically illustrated in the drawings is represented schematically in FIGS. 8–11. In FIG. 8, the respective lands 46, 48, 50 on the lower rim of inverted cup of core 80 each register with a respective port 50, 54, 56 communicating with the reservoir chambers. In this rotated position of core 80 and the associated actuating button 84, the valve is in the off position and this is the position represented in FIG. 3. As an additional lock to prevent any valve actuation, a step 160 (FIGS. 2 and 3) may be provided in the bottom of well 134 at one point in its periphery, and a cooperating projection 162 (FIGS. 3 and 6) on the under lip of cap 84 is formed to overlie the step, mechanically preventing any depressing of the cap. Rotation of the cap to any of its other settings removes the coincidence of the step and projection to allow the cap to be depressed. Upon rotating button 84 to the next detent position relative to indicator ring 128, land 46 is moved out of registration with port 52, while lands 48, 50 still cover their respective ports 54, 56. This is shown schematically in FIG. 9. Accordingly, with the button rotated to this position, when actuator 84 is depressed axially to move inner core 80 to the dispensing position, fluid contained in reservoir chamber 70 (with which port 52 communicates) is released and that chamber is exhausted through port 116 and inner core 80 to discharge outlet 86. The fluid in the other two chambers 72, 74 remains trapped because their respective ports 54, 56 are still blocked by the lands 48, 50 of the outer core 80. This setting of the valve assembly accordingly represents the minimum volume dispensing position for the assembly.

Figure 11:
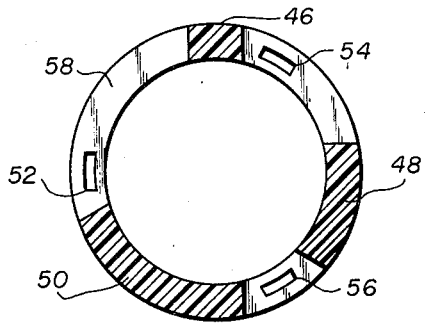

Upon rotating actuator button 84 and the associated core 80 to the next position, a second port 54 and its communicating chamber 72 are then opened so that when the actuator button is depressed, fluid in both chambers 70 and 72 will be discharged. Such porting position is illustrated schematically in FIG. 10. Finally, rotating the actuator button to the last position removes the blocking relation of all lands 46, 48, 50 from the respective ports 52, 54, 56 as seen in FIG. 11, so that all three chambers, 70, 72, 74 of the valve body 24 are then open. Depressing actuator button 84 in this rotated position thus provides the maximum volume of dispensed product.

FIG. 7 of the drawings illustrates a preferred design of the porting arrangement in the transverse wall 58 of valve body 24, in that the respective ports 52, 54, 56 are disposed circumferentially at the midpoint of a raised annular rib 156. The undersurface of the lands 46, 48 and 50 are correspondingly arcuately formed in a radial direction thereby minimizing any tendency for misalignment between the lands and the respective ports in a radial direction.

What is claimed is:

1. In an aerosol metering valve having provision for dispensing, upon each cycle of valve actuation, any one of several different preselected measured amounts of fluid product from an aerosol container in which said valve is mounted, the combination which comprises;
   a valve body defining a fluid duct having inlet and outlet openings at its opposite ends, and means for mounting said body in the mouth of a container;
   first valve means positioned in the outlet opening and an axially reciprocable valve core located in said duct normally preventing fluid exit from said outlet but depressible axially inwardly of said body to allow fluid to exit at said outlet;
   a plurality of separate metering chambers in said valve body and port means communicating each chamber with said fluid duct upstream of said first valve means;
   port closing means comprising an axially fixed but rotatable valve core disposed in said valve body outlet for selectively closing one or more of said ports depending on its rotated position relative to said valve body;
   and other valve means operated by said reciprocable valve core, said other means being disposed on the upstream side of said port means in said fluid duct and normally positioned to alow ingress of fluid to and from said chambers but closing said inlet when said reciprocable valve core is depressed inwardly of said valve body.

2. An aerosol metering valve as defined in claim 1, wherein said reciprocable valve core has a stem portion projecting axially outwardly of said outlet opening and accessible externally of said valve body to facilitate depressing said core axially, and said rotatable port closing valve core telescopingly receives said reciprocable valve core and makes a sliding seal therewith, said port closing core also having a stem portion projecting axially outwardly of said outlet opening and accessible externally of said valve body to facilitate rotating said port closing means.

3. An aerosol metering valve as defined in claim 2, wherein the projecting stem of said reciprocable core extends axially outwardly of the projecting stem of said rotatable port closing core.

4. An aerosol metering valve as defined in claim 3, which further includes an actuator member engaging both said projecting stem portions, said actuator member being frictionally engaged with the projecting stem of said reciprocable core and providing means for axially depressing said last named core, said actuator member being keyed to the projecting stem portion of said port closing core to prevent rotation relative thereto while allowing axial reciprocation relative thereto.

5. An aerosol metering valve as defined in claim 4, wherein said actuator member and said means for mounting the valve body in the container are provided with externally exposed indicator means to indicate the rotated position of said actuator member relative to said valve body.

6. An aerosol metering valve as defined in claim 5, wherein said valve body and body mounting and associated indicator means are formed with orienting detents to fix the relative assembled position of said members rotatively of the valve body.

7. An aerosol metering valve as defined in claim 4, wherein said actuator has a skirt portion and said mounting means carries a ring member on which said indicator means are disposed, said actuator also including a discharge outlet and duct means communicating said actuator outlet with said fluid duct outlet.

8. An aerosol metering valve as defined in claim 2, wherein said port means communicatnig each of said chambers in said valve body with said fluid duct are ports formed in and spaced circumferentially about said duct, and said rotatable valve core is formed with a plurality of circumferentially spaced lands disposed to cooperate with and selectively block one or more of said ports in different rotated positions of said rotatable core.

9. An aerosol metering valve as defined in claim 6, wherein said fluid duct is stepped radially outwardly at the outlet end thereof to provide a transverse partition, and said ports pass through said partition in a generally axial direction in communicating with said metering chambers.

10. In an aerosol metering valve having provision for dispensing, upon each cycle of valve actuation, any one of several different preselected amounts of fluid product from an aerosol container in which said valve is mounted, the combination which comprises:
   a cylindrical valve body having joined reservoir and neck portions open at their free ends, and a first annular seal received in the open end of said neck portion;
   mounting means for said valve body adapted to seat in the mouth of an aerosol container to close said container, said means having a central upstanding boss with an end wall overlying the open neck of said valve housing, said boss being formed with means gripping the neck of said valve housing to support said housing from said mounting means, and an aperture in the end wall of said boss;
   an axially fixed but rotatable tubular core telescopingly received in the neck of said housing, said valve core having an inner enlarged portion forming an inverted cup and having a stem of reduced diameter joined to said cup and extending outwardly through the aperture in said boss;
   said rotatable core having an inner and an external annular shoulder formed at the junction of said cup and stem portions, said external annular shoulder being disposed adjacent the inner face of the end wall of said boss, said first annular seal encircling said core stem and confined between said end wall and external shoulder, said inverted cup having its rim castellated to provide a plurality of circumferentially spaced arcuate lands;
   said valve housing having a first transverse wall at the junction of its reservoir and neck portions, and a second transverse wall at its inner end defining said reservoir portion therebetween, said reservoir portion having at least two radially disposed partitions parallel to the axis of the valve body intersecting said transverse walls to divide said reservoir interiorly into a plurality of separate axial chambers, and a plurality of ports passing through said first transverse wall, equal in number to the number of axial chambers, each of said ports communicating the interior of said neck with one of said chambers, said ports being circumferentially spaced on a diameter equal to that of the rim of said inverted cup and adapted to register with the lands of the cup rim to close off said apertures progressively with rotation of said first valve core about its axis;

a reciprocable valve core telescopically received within said rotatable core, said reciprocable core having an annular enlargement intermediate its ends, a hollow tubular stem portion extending outwardly of said enlargement and a longitudinally grooved stem portion extending inwardly of said annular enlargement; said reciprocable core being closed at its inner end;

a second annular seal surrounding the tubular stem of said reciprocable core member and disposed between the annular enlargement thereof and said inner annular shoulder of said rotatable valve core, and compression spring means surrounding said grooved stem portion and confined between said annular enlargement and the transverse wall of said valve housing to bias both valve cores outwardly against the respective first and second annular seals;

said reciprocable core having a radial port in its side wall communicating with said hollow stem portion thereof and spaced axially outwardly of the annular enlargement thereon so as to be disposed outside said second annular seal in the normal non-depressed position of the valve stem, said port being moved axially inward of said second annular seal in the depressed position of said inner core member to provide communication of its hollow stem portion with the interior of the neck of said valve housing for discharge of fluid product from said valve housing neck portion through said port into said tubular valve stem;

said valve housing having a central aperture in said first transverse partition for the passage therethrough of said grooved stem portion of said inner core, and a hollow post forming a fluid inlet feed passage to said valve housing neck portion depending from said transverse partition and aligned with said aperture therein, said post extending below said second transverse partition and having an inlet opening thereat for influx of fluid to the neck portion of said valve housing;

a resilient tubular boot telescopingly received in said hollow post, said boot having a flange at its outer end to secure it against axial movement and having an orifice through its bottom wall, said grooved stem portion of said reciprocable core projecting into said boot in endwise spaced relation to the orifice therein in a normal non-depressed position of said core, said stem portion engaging the bottom wall of the boot in the depressed dispensing position of said core to close off the orifice and prevent influx of fluid through said feed passage in said post;

actuator means engaging the projecting hollow stem portion of said reciprocable core member externally and independently of said rotatable core to enable said reciprocable core to be axially depressed relative to said rotatable core, said actuator means having a discharge duct for directing fluid released through said valve to atmosphere.

References Cited

UNITED STATES PATENTS

| | | | |
|---|---|---|---|
| 2,772,814 | 12/1956 | Meyers | 222—402.20 |
| 3,104,785 | 9/1963 | Beard | 222—436 X |

SAMUEL F. COLEMAN, Primary Examiner

H. S. LANE, Assistant Examiner

U.S. Cl. X.R.

222—429